(12) United States Patent
    Ito

(10) Patent No.: US 10,737,591 B2
(45) Date of Patent: Aug. 11, 2020

(54) SEAT DRIVING DEVICE

(71) Applicant: AISIN SEIKI KABUSHIKI KAISHA, Kariya-shi (JP)

(72) Inventor: Sadao Ito, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 494 days.

(21) Appl. No.: 15/547,160

(22) PCT Filed: Dec. 23, 2015

(86) PCT No.: PCT/JP2015/085899
    § 371 (c)(1),
    (2) Date: Jul. 28, 2017

(87) PCT Pub. No.: WO2016/125410
    PCT Pub. Date: Aug. 11, 2016

(65) Prior Publication Data
    US 2018/0029505 A1    Feb. 1, 2018

(30) Foreign Application Priority Data
    Feb. 3, 2015 (JP) .................................. 2015/019463

(51) Int. Cl.
    *B60N 2/00* (2006.01)
    *B60N 2/16* (2006.01)
    (Continued)

(52) U.S. Cl.
    CPC ........... *B60N 2/165* (2013.01); *B60N 2/0715* (2013.01); *B60N 2/22* (2013.01); *B60N 2/2213* (2013.01);
    (Continued)

(58) Field of Classification Search
    CPC ........ B60N 2/165; B60N 2/22; B60N 2/2213; B60N 2/64; B60N 2/80
    (Continued)

(56) References Cited

U.S. PATENT DOCUMENTS 1,303,161 A * 5/1919 Cavanagh ............... H01H 23/16
                                                                                200/559
2,179,171 A * 11/1939 Boho ....................... F16H 3/02
                                                                                74/665 GA
(Continued)

FOREIGN PATENT DOCUMENTS

CN          1985065 A      6/2007
CN        203995792 U    12/2014
(Continued)

OTHER PUBLICATIONS

International Preliminary Report on Patentability and Written Opinion dated Aug. 8, 2017 in PCT/JP2015/085899.
(Continued)

*Primary Examiner* — William C Joyce
(74) *Attorney, Agent, or Firm* — Oblon, McClelland, Maier & Neustadt, L.L.P.

(57) ABSTRACT

A seat driving device includes a rotary motor having a rotary shaft, operation members, and clutch mechanisms. The operation members are separately arranged to respectively correspond to position adjustment mechanisms. The clutch mechanisms are separately arranged to respectively correspond to the position adjustment mechanisms. When any one of the operation members is operated, each clutch mechanism selectively connects the corresponding position adjustment mechanism to the rotary motor. In response to operation of any one of the operation members, the rotary motor is energized with the polarity corresponding to the operation direction of the operation member. Each clutch mechanism is arranged with respect to the rotary motor such
(Continued)

that the axis of the clutch mechanism is parallel with the axis of the rotary shaft.

7 Claims, 9 Drawing Sheets

(51) Int. Cl.
    *B60N 2/80*     (2018.01)
    *B60N 2/22*     (2006.01)
    *B60N 2/64*     (2006.01)
    *B60N 2/07*     (2006.01)
    *B60N 2/02*     (2006.01)

(52) U.S. Cl.
    CPC ............... *B60N 2/64* (2013.01); *B60N 2/80* (2018.02); *B60N 2002/0236* (2013.01)

(58) Field of Classification Search
    USPC .......................... 74/665 G, 665 GA, 665 GD
    See application file for complete search history.

(56) References Cited

U.S. PATENT DOCUMENTS

| | | | | |
|---|---|---|---|---|
| 3,406,795 | A * | 10/1968 | Pickles | F16D 21/02 477/12 |
| 4,284,935 | A * | 8/1981 | March | H02P 7/03 318/257 |
| 4,299,316 | A * | 11/1981 | Reinmoeller | B60N 2/0224 192/30 W |
| 4,920,238 | A * | 4/1990 | Aso | G04C 3/001 200/339 |
| 4,932,290 | A * | 6/1990 | Toyoda | B60N 2/0232 192/48.8 |
| 5,103,691 | A * | 4/1992 | Periou | B60N 2/0248 74/665 GD |
| 6,553,867 | B1 * | 4/2003 | Ursel | B60N 2/0224 74/665 G |
| 2006/0011005 | A1 | 1/2006 | Wisner et al. | |
| 2014/0238188 | A1 | 8/2014 | Ito | |

FOREIGN PATENT DOCUMENTS

| | | |
|---|---|---|
| JP | 58-97528 A | 6/1983 |
| JP | 2011-178202 A | 9/2011 |
| JP | 2013-107624 A | 6/2013 |
| WO | 2010/084882 A1 | 7/2010 |
| WO | 2013/061715 A1 | 5/2013 |

OTHER PUBLICATIONS

International Search Report dated Mar. 22, 2016 in PCT/JP2015/085899 filed Dec. 23, 2015.

* cited by examiner

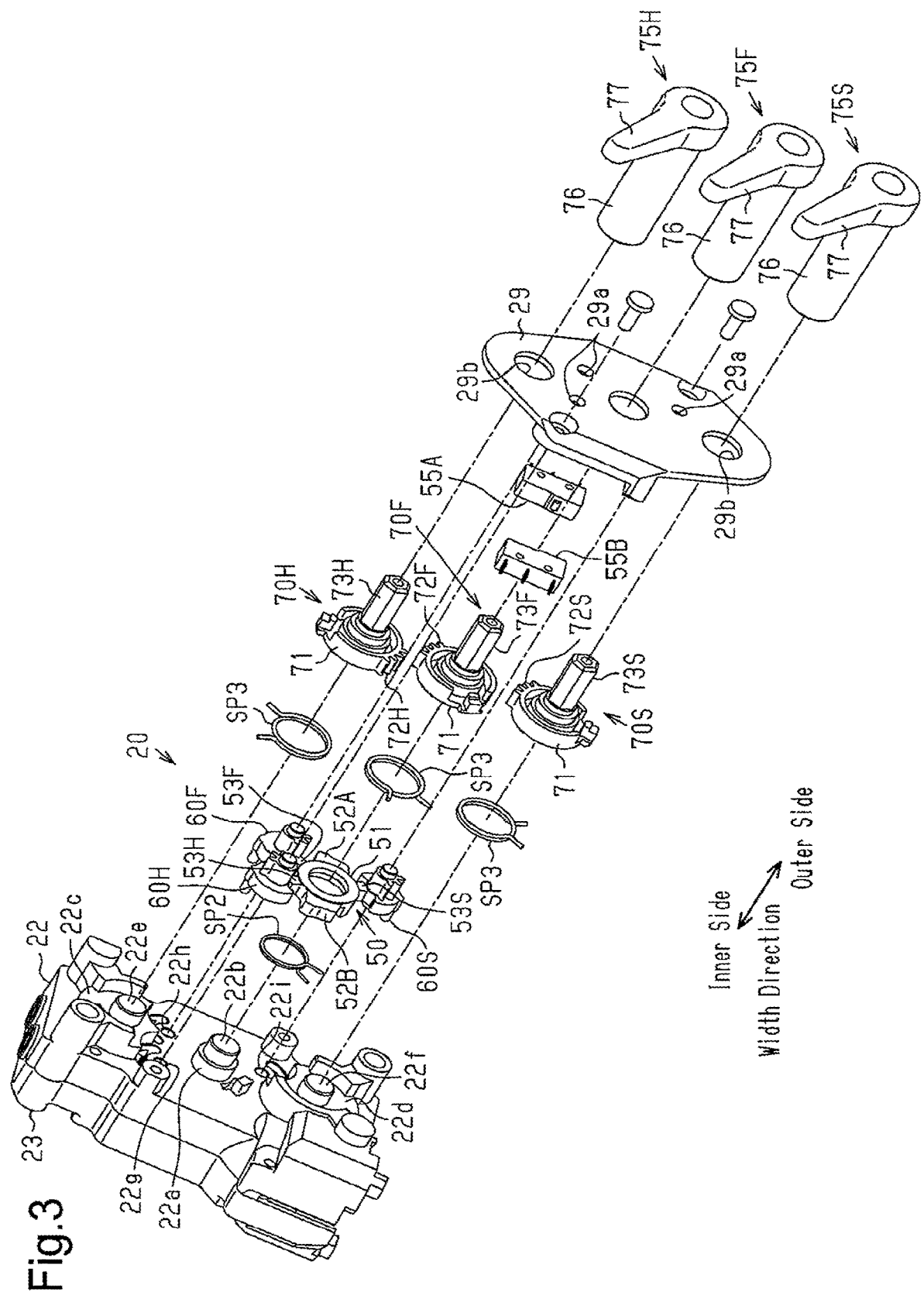

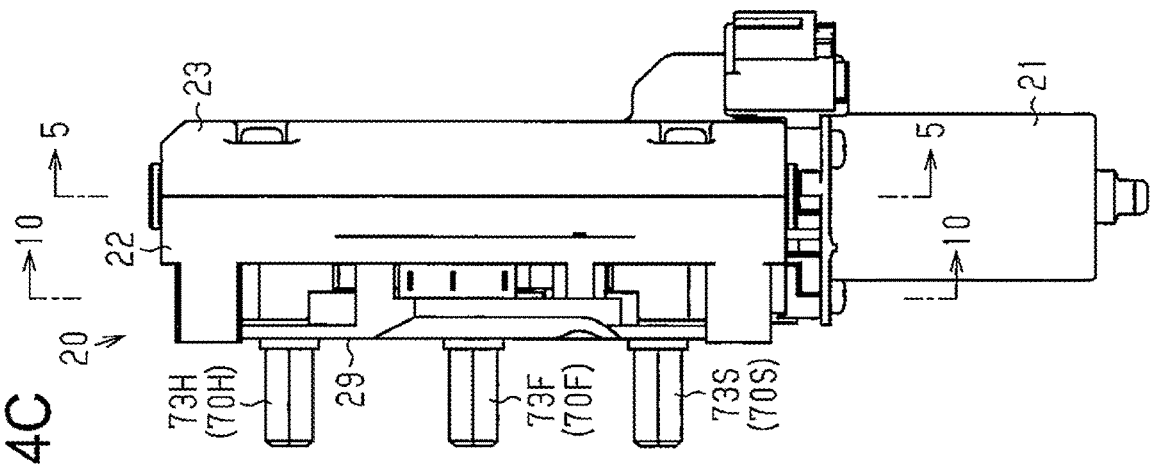
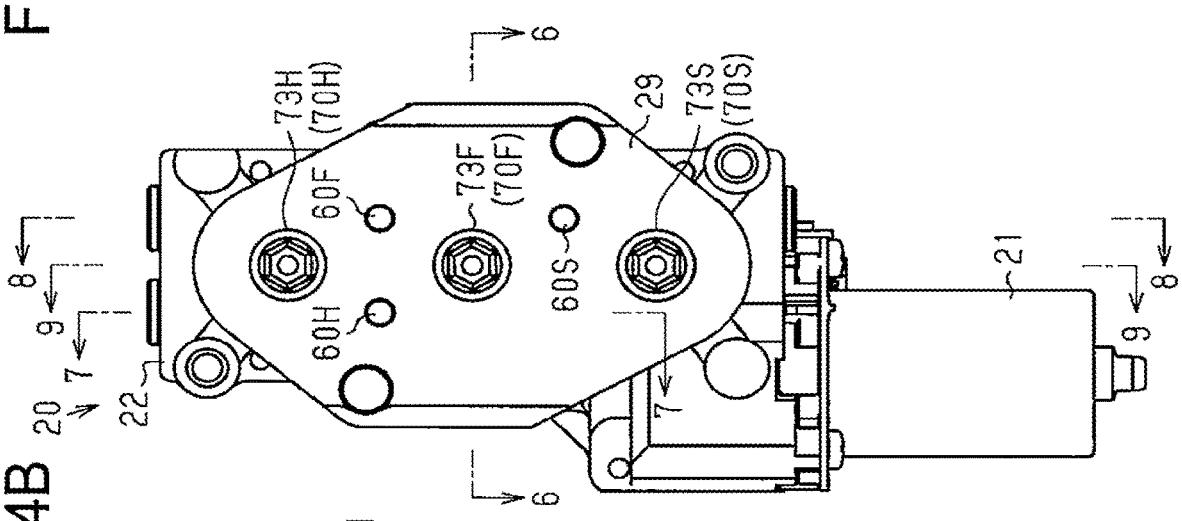
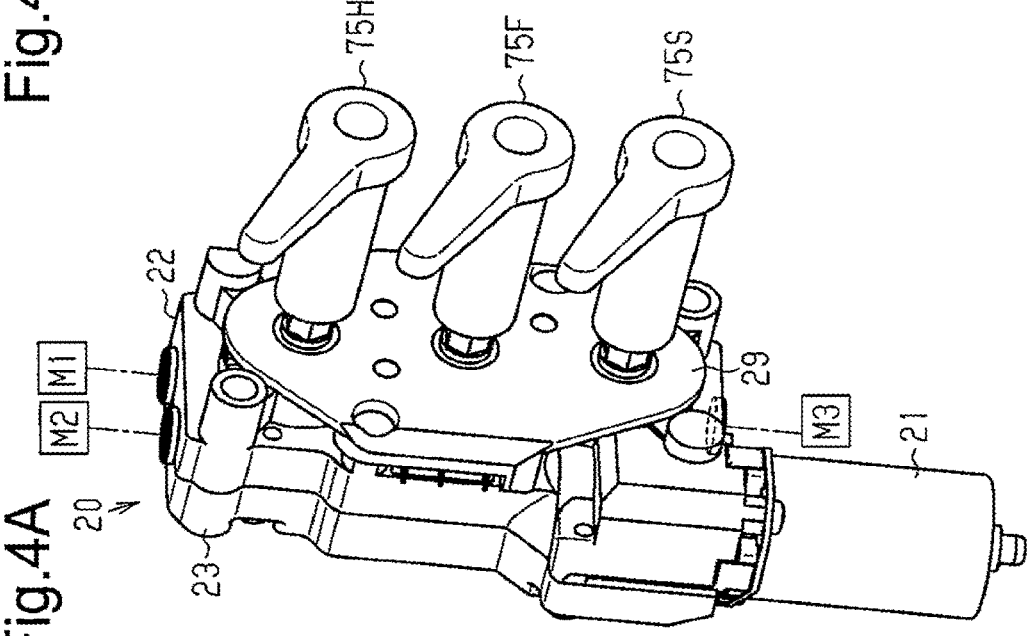

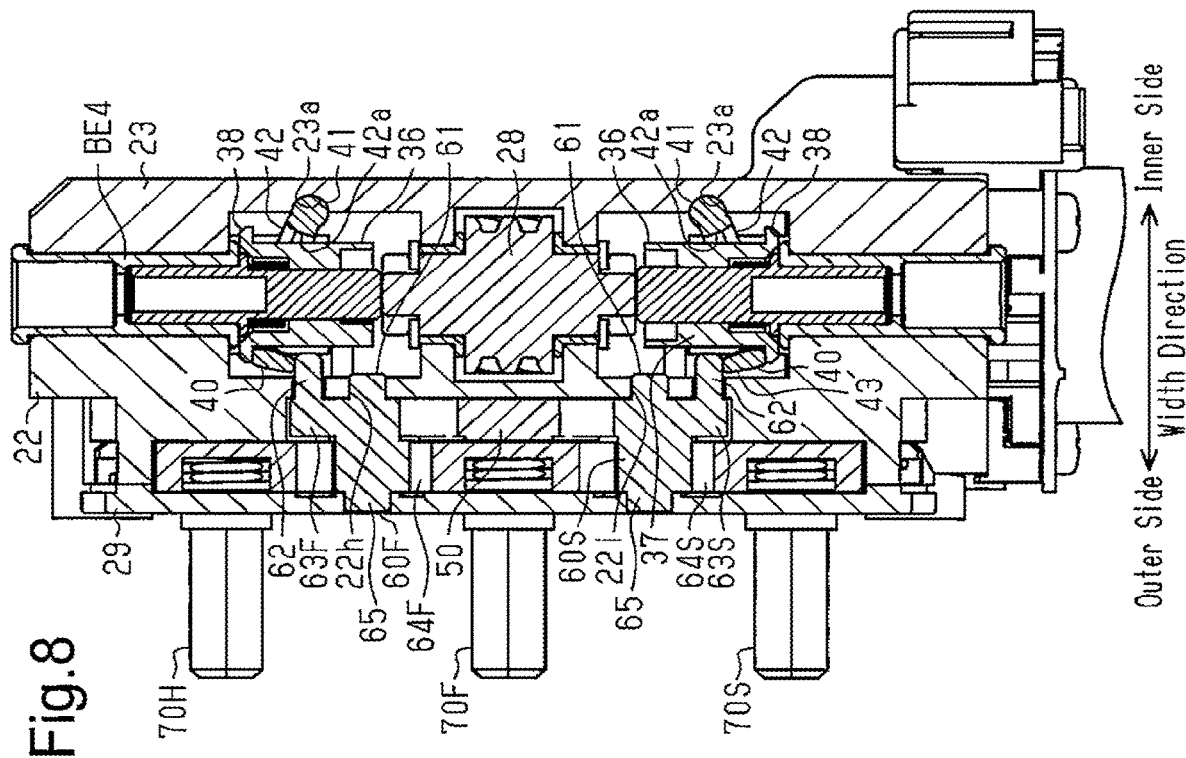
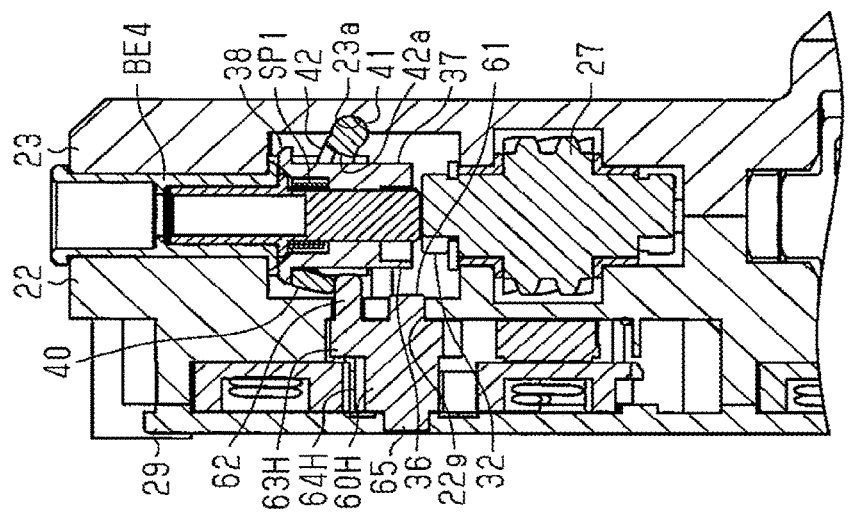

SEAT DRIVING DEVICE

TECHNICAL FIELD

The present invention relates to a seat driving device for selectively operating a plurality of position adjustment mechanisms with a rotary motor.

BACKGROUND ART

Conventionally, a seat driving device has been proposed in, for example, Patent Document 1. The seat driving device includes a rotary motor, operation members, and clutch mechanisms. The operation members are separately arranged to correspond to position adjustment mechanisms provided on the seat. The clutch mechanisms are separately arranged to correspond to the position adjustment mechanisms. In response to operation of any one of the operation members, the clutch mechanisms selectively connect the corresponding position adjustment mechanism to the rotary motor. In response to operation of any one of the operation members, the rotary motor is energized with the polarity corresponding to the operation direction of the operation member.

Rotation of the rotary shaft of the rotary motor is transmitted to each clutch mechanism via a gear train of a skew arrangement composed of a worm provided on the rotary shaft and a worm wheel provided on the input shaft of each clutch mechanism.

PRIOR ART DOCUMENT

Patent Document

Patent Document 1: Japanese Laid-Open Patent Publication No. 2013-107624

SUMMARY OF THE INVENTION

Problems that the Invention is to Solve

In Patent Document 1, the gear train of a skew arrangement composed of a worm and a worm wheel requires that the rotary motor and the clutch mechanisms be arranged in a T-shaped space. This enlarges the overall size of the device.

It is an objective of the present invention to provide a seat driving device that can be downsized.

Means for Solving the Problems

To achieve the foregoing objective and in accordance with one aspect of the present invention, a seat driving device is provided that includes a rotary motor having a rotary shaft, a plurality of operation members, a plurality of clutch mechanisms, a driving gear, and a follower gear. The operation members are separately arranged to respectively correspond to a plurality of position adjustment mechanisms. The rotary motor is configured such that, when any one of the operation members is operated, the rotary motor is energized with a polarity that corresponds to an operation direction of the operation member. The clutch mechanisms are separately arranged to respectively correspond to the position adjustment mechanisms. Each clutch mechanism is configured such that, when any one of the operation members is operated, the clutch mechanism selectively connects the corresponding position adjustment mechanism to the rotary motor. The driving gear is provided on the rotary shaft. The follower gear meshes with the driving gear and constitutes an input shaft of each clutch mechanism. Each of the clutch mechanisms is arranged with respect to the rotary motor such that an axis of the clutch mechanism is parallel with an axis of the rotary shaft of the rotary motor. The "follower gear meshing with the driving gear" may be a follower gear that is directly engaged with the driving gear, or a follower gear that is indirectly engaged with the driving gear (for example, via another follower gear).

BRIEF DESCRIPTION OF THE DRAWINGS

FIG. 3 is an exploded perspective view showing the structure of the seat driving device of FIG. 1.

FIG. 4A is a perspective view showing the structure of the seat driving device of FIG. 1.

FIG. 4B is a side view of the seat driving device of FIG. 4A, as viewed from the outside in the seat width direction.

FIG. 4C is a side view of the seat driving device of FIG. 4A, as viewed from the rear of the seat.

FIG. 7 is a cross-sectional view taken along line 7-7 of FIG. 4B.

FIG. 8 is a cross-sectional view taken along line 8-8 of FIG. 4B.

MODES FOR CARRYING OUT THE INVENTION

A seat driving device according to one embodiment will now be described. In the following description, the front-rear direction of the seat will simply be referred to as "front-rear direction", and the upper and lower sides in the seat height direction will simply be referred to as "upper side" and "lower side," respectively.

Figure 1:
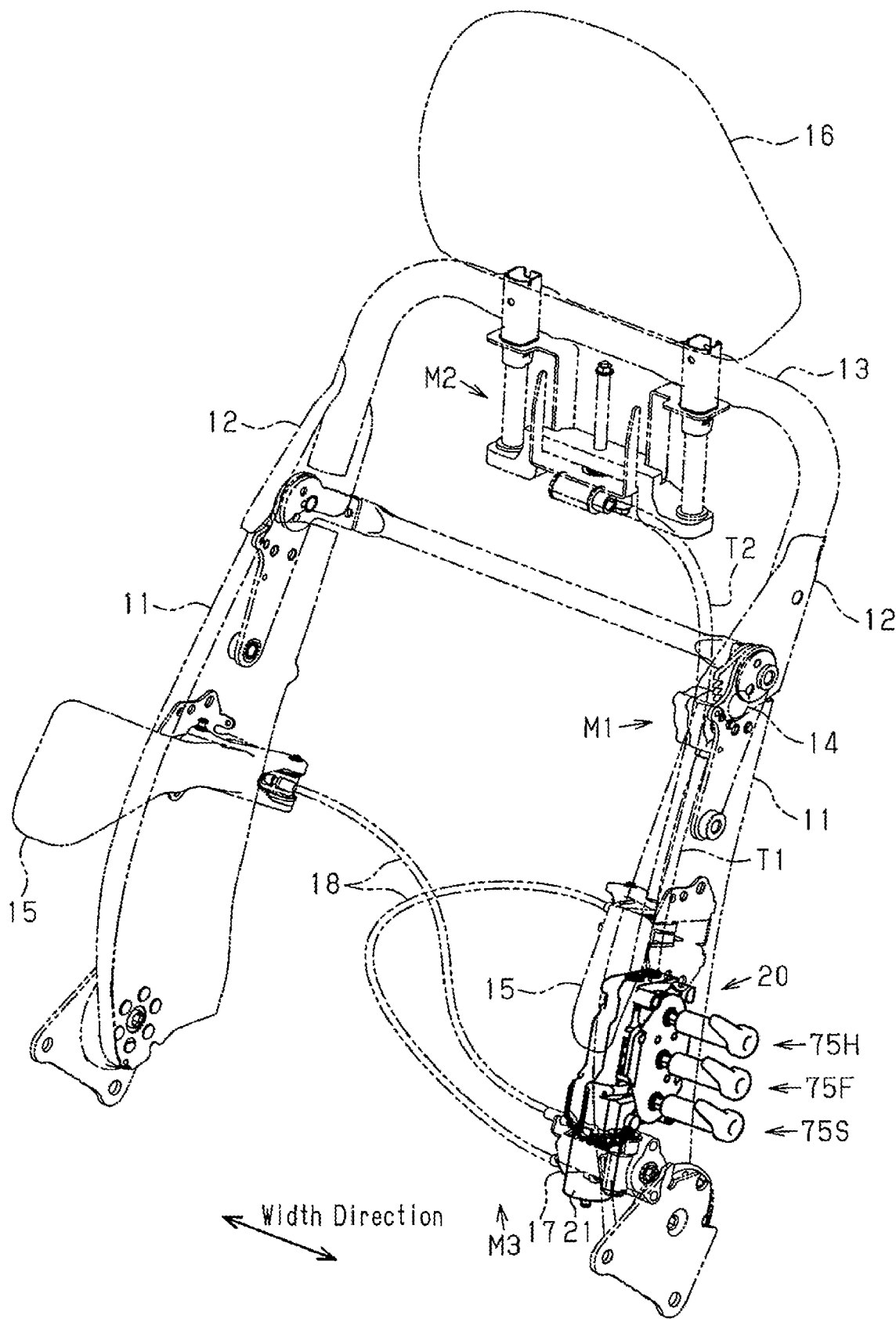
FIG. 1 is a perspective view showing the framework of a six-way power seat in which a seat driving device according to one embodiment is employed.
Figure 2:
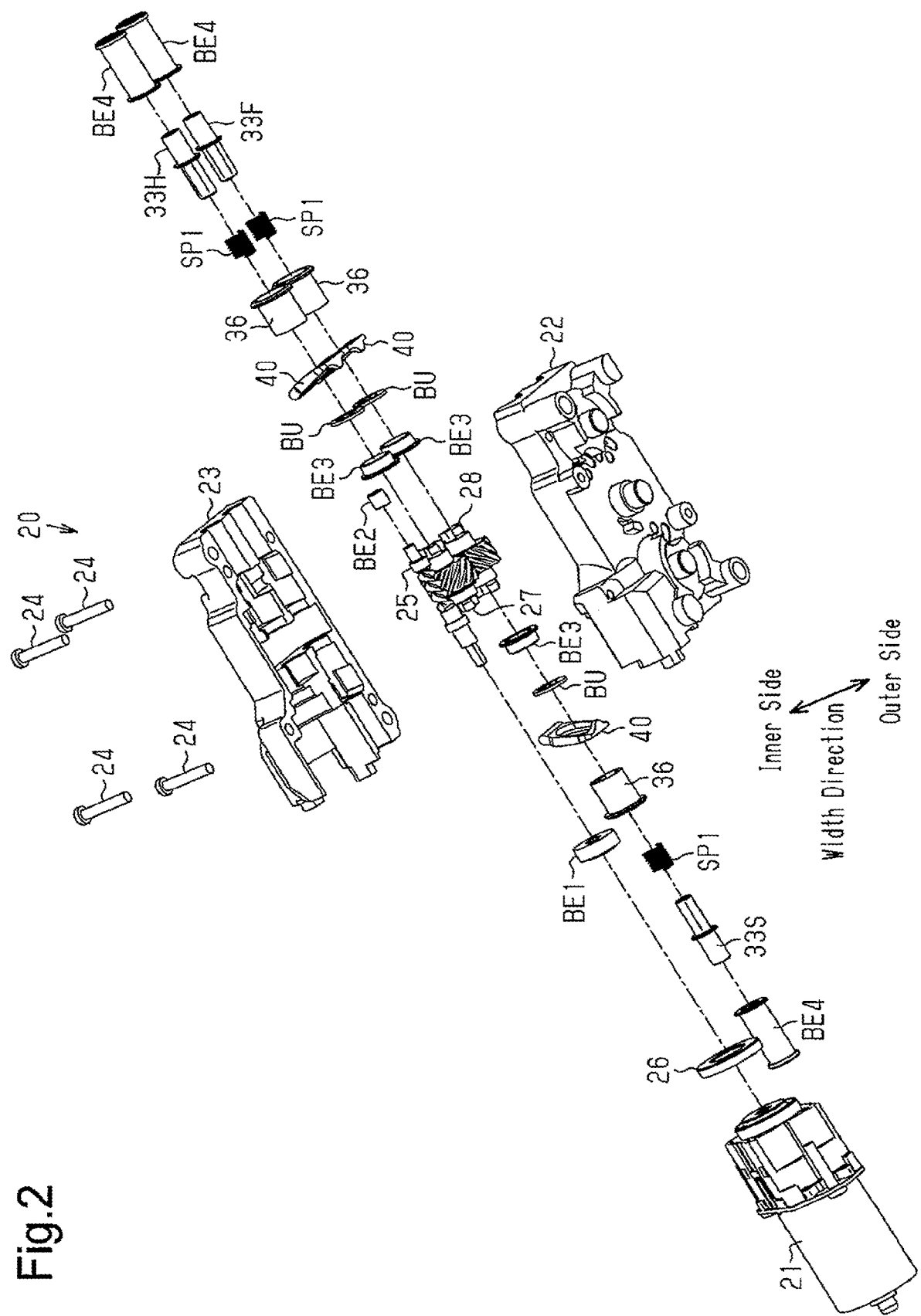
FIG. 2 is an exploded perspective view showing the structure of the seat driving device of FIG. 1.

As shown in FIG. 1, for example, a vehicle seat device to be mounted on the front side in the passenger compartment of a vehicle such as an automobile includes a pair of lower side frames 11, which is preferably made of metal plates, a pair of upper side frames 12, which is preferably made of metal plates, and a substantially U-shaped pipe frame 13, which is preferably made of a metal tube. The lower side frames 11 are arranged on the opposite sides in the seat width direction of the lower seat back that support the lumbar region of the occupant and constitute the framework of the lower seat back. The upper side frames 12 are arranged on the opposite sides in the seat width direction of the upper seat back that support the scapulae of the occupant and constitute the framework of the upper seat back. Similarly, the pipe frame 13, which constituting the framework of the upper seat back, connects the upper ends of the upper side frames 12 to each other.

The upper end of each lower side frame 11 and the lower end of the corresponding upper side frames 12 are coupled to each other to be pivotal about an axis extending in the seat width direction by a substantially columnar pivot shaft 14, which extends in the seat width direction through the upper and lower ends of the lower and upper side frames 11, 12. A seat back bending mechanism M1 as a position adjustment mechanism is arranged between the lower side frames 11 and the upper side frames 12.

A side support frame 15 made of, for example, metal and forming the framework of a side support capable of supporting the side of the occupant is pivotally connected to each lower side frame 11. When the side support frames 15 pivot with respect to the lower side frames 11, the side supports open and close in the seat width direction.

The pipe frame 13 is provided with a headrest height adjustment mechanism M2 as a position adjustment mechanism for moving a headrest 16 that supports the head of the occupant in the seat height direction.

A seat driving device 20 is attached to the lower side frame 11 on one side (right side as viewed in FIG. 1). The seat driving device 20 has a rotary motor 21, which is, for example, a brush motor. The seat driving device 20 is capable of transmitting rotation of the rotary motor 21 to the seat back bending mechanism M1 via a torque cable T1 extending upward. When receiving rotation of the rotary motor 21, the seat back bending mechanism M1 pivots the upper side frames 12 relative to the lower side frames 11, thereby adjusting the inclination angle in the front-rear direction of the upper seat back with respect to the lower seat back.

The seat driving device 20 is capable of transmitting rotation of the rotary motor 21 to the headrest height adjustment mechanism M2 via a torque cable T2 extending upward. When receiving rotation of the rotary motor 21, the headrest height adjustment mechanism M2 lifts or lowers the headrest 16, thereby adjusting the position of the headrest 16 in the seat height direction.

The seat driving device 20 is capable of transmitting rotation of the rotary motor 21 to a conversion mechanism 17 located below. The conversion mechanism 17 converts rotation of the rotary motor 21 into a linear motion and transmits the linear motion to the side support frames 15 via a pair of push-pull cables 18. This causes the side support frames 15 to pivot with respect to the lower side frames 11, so that the opening degree of the side supports in the seat width direction is adjusted. The conversion mechanism 17 and the push-pull cables 18 constitute a side support adjustment mechanism M3 as a position adjustment mechanism.

That is, the seat driving device 20 is configured to have three output shafts having two output shafts at the top and one output shaft at the bottom.

As shown in FIGS. 2, 3, and 4A to 4C, the seat driving device 20 includes a pair of main body case members 22, 23 split into two in the seat width direction. The main body case members 22, 23 are fastened to each other at four corners thereof by four screws 24 inserted from the inner side in the seat width direction. The rotary motor 21 is arranged below the main body case members 22, 23, and the axis of the rotary shaft of the rotary motor 21 extends substantially in the seat height direction. The rotary motor 21 is fitted in a downward opening formed by cooperation of the main body case members 22, 23.

Figure 5:
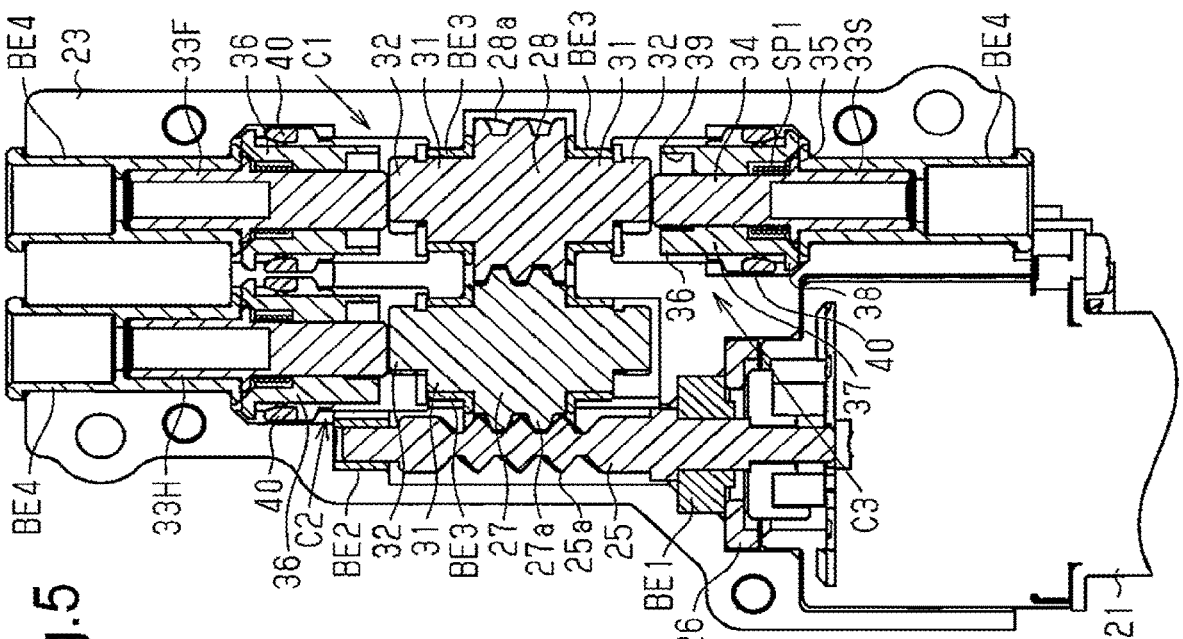
FIG. 5 is a cross-sectional view taken along line 5-5 of FIG. 4C.

A helical gear 25 as a driving gear is provided on the rotary shaft of the rotary motor 21. The helical gear 25 constitutes part of the rotary shaft of the rotary motor 21 and extends upward from the rotary motor 21. The helical gear 25 may be integral with the rotary shaft or may be a separate member from the rotary shaft. As shown in FIG. 5, the helical gear 25 is preferably a low-tooth-count helical gear having a helical gear portion 25a having a tooth count of four or less (in the present embodiment, two). The helical gear 25 is rotationally accommodated in the main body case members 22, 23 in a state where a pair of bearings BE1 and BE2, which pivotally support the opposite axial ends of the helical gear 25, is held by the main body case members 22, 23. A substantially annular spacer 26 is arranged in the main body case members 22, 23 between the rotary motor 21 and the bearing BE1.

Figure 6:
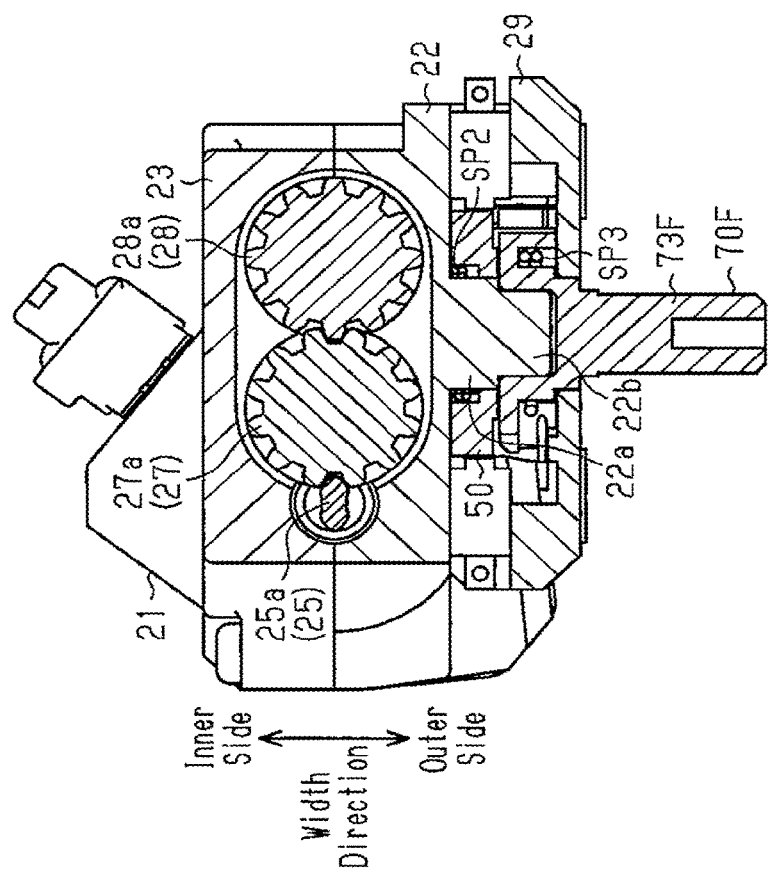
FIG. 6 is a cross-sectional view taken along line 6-6 of FIG. 4B.

A helical gear 27, which serves as a follower gear, is rotationally supported in the main body case members 22, 23. The helical gear 27 is adjacent to a side in the radial direction of the helical gear 25 (on the right side as viewed in FIG. 5) and has an axis that is parallel with the axis of the helical gear 25 (in other words, the axis of the rotary motor 21). The helical gear 27 has a helical gear portion 27a meshing with the helical gear portion 25a. Another helical gear 28, which serves as a follower gear, is rotationally supported in the main body case members 22, 23. The helical gear 28 is adjacent to a side in the radial direction of the helical gear 27 (on the right side as viewed in FIG. 5) and has an axis that is parallel with the axis of the helical gear 27. The helical gear 28 has a helical gear portion 28a meshing with the helical gear portion 28a. The helical gear portion 28a indirectly meshes with the helical gear portion 25a (via the helical gear portion 27a). As also shown in FIG. 6, the numbers of teeth of the two helical gear portions 27a, 28a are equal to each other, and are sufficiently greater than the number of teeth of the helical gear portion 25a.

Figure 12:
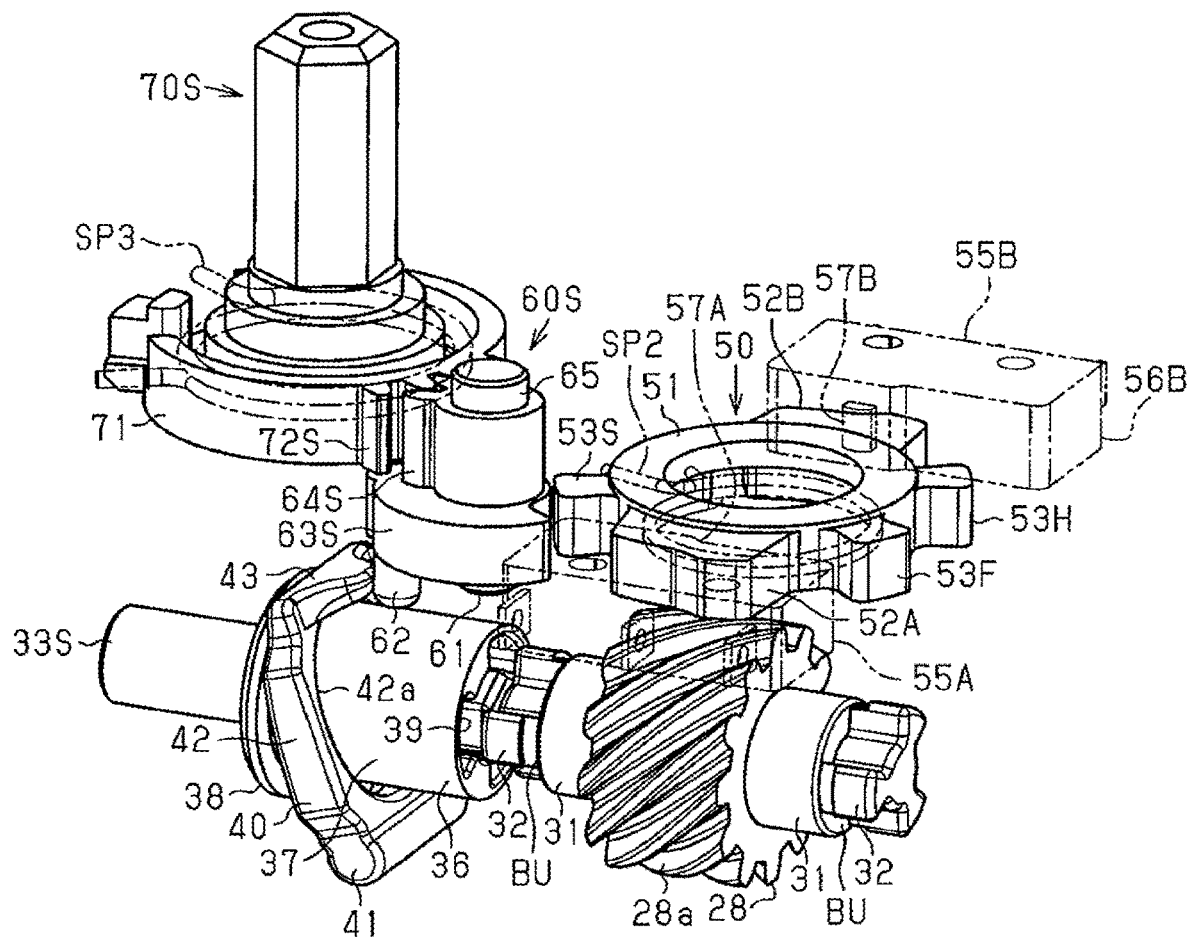
FIG. 12 is a perspective view showing an operation of the seat driving device of FIG. 1 when the operation handle is in the initial position.

As also shown in FIG. 12, the helical gear 28 has a pair of shaft portions 31 and a pair of fitting portions 32. The shaft portions 31 project from the opposite ends in the axial direction of the helical gear portion 28a and pivotally supported by the main body case members 22, 23 via bearings BE3. The fitting portions 32 project from the distal ends in the axial direction of the shaft portions 31, respectively. Each fitting portion 32 has an outer shape of a substantially three-blade body, in which is a combination of a columnar body and three arcuate prism-shaped bodies extending radially outward at equal angular intervals from the columnar body. The other helical gear 27 has the same shape.

A bearing bushing BE4 is held between the main body case members 22 and 23. The bearing bushing BE4 is arranged coaxially with the helical gear 27 and located on one side in the axial direction the upper side as viewed in FIG. 5) of the helical gear 27. The distal end of a headrest height adjustment shaft 33H is pivotally supported by the distal end of the bearing bushing BE4, which faces the helical gear 27. The headrest height adjustment shaft 33H has a square socket at the distal end. The torque cable T2 is fitted into the square socket, so that the headrest height adjustment shaft 33H is coupled to the torque cable T2 to rotate integrally.

Further, two more bearing bushings BE4 are held between the main body case members 22 and 23. These bearing bushings BE4 are arranged coaxially with the helical gear 28 and located on one side and the other side in the axial direction (the upper and lower sides as viewed in FIG. 5) of the helical gear 28. The distal ends of a seat back bending shaft 33F and a side support adjustment shaft 33S are pivotally supported by the distal ends of the two bearing bushings BE4 that face the helical gear 28. The seat back bending shaft 33F has a square socket at the distal end. The torque cable T1 is fitted into the square socket, so that the seat back bending shaft 33F is coupled to the torque cable T1 to rotate integrally. The side support adjustment shaft 33S has a square socket at the distal end. The input shaft (for example, a torque cable, not shown) of the conversion mechanism 17 is fitted into the square socket, so that the side support adjustment shaft 33S is coupled to the input shaft to rotate integrally.

When any one of the seat back bending shaft 33F, the headrest height adjustment shaft 33H, and the side support adjustment shaft 33S rotates, the corresponding one of the seat back bending mechanism M1, headrest height adjustment mechanism M2, and side support adjustment mechanism M3 is actuated to adjust the position of the corresponding part of the seat. That is, the seat of the present embodiment is a so-called six-way power seat, which is capable of adjusting back and forth the positions of the parts of the seat in the seat back bending mechanism M1, the headrest height adjustment mechanism M2, and the side support adjustment mechanism M3.

Since the headrest height adjustment shaft 33H, the seat back bending shaft 33F, and the side support adjustment shaft 33S have the same structure except for their arrangement and the like, the peripheral structure of the side support adjustment shaft 33S will be described as a representative of these shafts in some cases.

As shown in FIGS. 5 and 12, the side support adjustment shaft 33S has a substantially columnar shape and has an output-side fitting portion 34 extending from the bearing bushing BE 4 toward the helical gear 28. In addition, the side support adjustment shaft 33S has an outward flange 35 at an axially middle portion adjacent to the open end of the bearing bushing BE4.

A cylindrical member 36 is arranged between the fitting portion 32 of the helical gear 28 and the flange 35 of the side support adjustment shaft 33S. The cylindrical member 36 has a cylindrical portion 37 and a flange-shaped pressing part 38 projecting radially outward from the distal end opposed to the flange 35 of the cylindrical portion 37. The output-side fitting portion 34 is inserted in the cylindrical member 36 so as to rotate integrally with the side support adjustment shaft 33S and to be movable in the axial direction with respect to the side support adjustment shaft 33S. The cylindrical member 36 has a fitting hole 39 that can be fitted to the fitting portion 32. When the cylindrical member 36 moves in the axial direction toward the helical gear 28, the fitting hole 39 is fitted to the fitting portion 32 so that the cylindrical member 36 rotates integrally with the helical gear 28.

Rotation of the helical gear 28 can be transmitted to the side support adjustment shaft 33S via the cylindrical member 36 when the cylindrical member 36 moves to fit the fitting hole 39 to the fitting portion 32. When the fitting portion 32 and the fitting hole 39 are disengaged, transmission of rotation from the helical gear 28 to the side support adjustment shaft 33S via the cylindrical member 36 is interrupted. As described above, the side support adjustment mechanism M3 is actuated by rotating the side support adjustment shaft 33S. The fitting portion 32 of the helical gear 28, the output-side fitting portion 34 of the side support adjustment shaft 33S, and the cylindrical member 36 constitute a clutch mechanism C3 for selectively connecting the helical gear 28 and the side support adjustment shaft 33S to each other. The helical gear 28 (specifically, the fitting portion 32) corresponds to the input shaft of the clutch mechanism C3, and the side support adjustment shaft 33S (specifically, the output-side fitting portion 34) corresponds to the output shaft of the clutch mechanism C3. The input shaft and the output shaft are coaxial.

The output-side fitting portion 34 of the side support adjustment shaft 33S is inserted into a compression spring SP1, which is made of a coil spring and arranged between the cylindrical member 36 and the flange 35 on the radially inner side of the pressing part 38. The compression spring SP1 constantly urges the cylindrical member 36 toward the fitting portion 32 of the helical gear 28. That is, the compression spring SP1 constantly urges the cylindrical member 36 in a direction of enabling the rotation of the helical gear 28 to be transmitted to the side support adjustment shaft 33S. When the rotation of the helical gear 28 cannot be transmitted to the side support adjustment shaft 33S, the cylindrical member 36 has moved against the force of the compression spring SP1 to a position where the cylindrical member 36 is disengaged from the fitting portion 32.

The fitting portion 32 is fitted into a substantially annular buffer member BU made of, for example, elastomer, rubber, or the like. The buffer member BU is brought into close contact with the distal end face of the shaft portion 31 that forms a step between the fitting portion 32 and the shaft portion 31. When the fitting portion 32 of the helical gear 28 is fitted in the fitting hole 39 of the cylindrical member 36, the distal end face of the cylindrical member 36 comes into contact with the buffer member BU. As a result, the distal end face of the cylindrical member 36 is prevented from directly contacting the distal end face of the shaft portion 31, and the hitting sound caused by the abutment between these distal end faces is reduced.

A clutch mechanism C1 is arranged between the helical gear 28 and the seat back bending shaft 33F to selectively connect these to each other. A clutch mechanism C2 is arranged between the helical gear 27 and the headrest height adjustment shaft 33H to selectively connect these to each other. These clutch mechanisms C1, C2 have the same structure as the above described clutch mechanism C3.

In each of the clutch mechanisms C1 to C3, the cylindrical portion 37 of the cylindrical member 36 is loosely inserted in an intermediary member 40 supported by the main body case member 23. That is, as shown in FIGS. 7 and 8, the body case 23 includes a substantially semicircular bearing groove 23a. The bearing groove 23a is located between the pressing part 38 of the cylindrical member 36 and the helical gear 27 (28) opposed to the pressing part 38. The bearing groove 23a extends in a direction perpendicular to the seat width direction and the axial direction (in the direction orthogonal to the sheet of the drawing).

The intermediary member 40 has a major arc-shaped shaft portion 41 received in the bearing groove 23a. The intermediary member 40 also has a substantially rectangular frame-shaped main body 42, which crosses the cylindrical portion 37 of the cylindrical member 36 while orthogonally intersecting the axis of the cylindrical portion 37 (refer to FIG. 12). The cylindrical portion 37 is loosely inserted into a substantially circular insertion hole 42a formed in the main body 42. Therefore, the intermediary member 40 is permitted to pivot about the bearing groove 23a in a predetermined allowable range without being obstructed by the cylindrical portion 37. In this allowable range, the intermediary member 40 pivots substantially along the axis of the cylindrical member 36 (the moving direction of the cylindrical member 36).

The main body 42 of the intermediary member 40 is engageable with the pressing part 38 of the cylindrical member 36. When the main body 42 pivots away from the helical gear (28) about the shaft portion 41, the main body 42 presses the pressing part 38 to move the cylindrical member 36 in the axial direction against the force of the compression spring SP1. As a result, the fitting hole 39 of the cylindrical member 36 is disengaged from the fitting portion 32 of the helical gear 27 (28). Further, when the main body 42 pivots toward the helical gear 27 (28) about the shaft portion 41, the cylindrical member 36 is urged by the compression spring SP1 so that the fitting hole 39 is moved to engage with the fitting portion 32 of the helical gear 27 (28).

Figure 9:
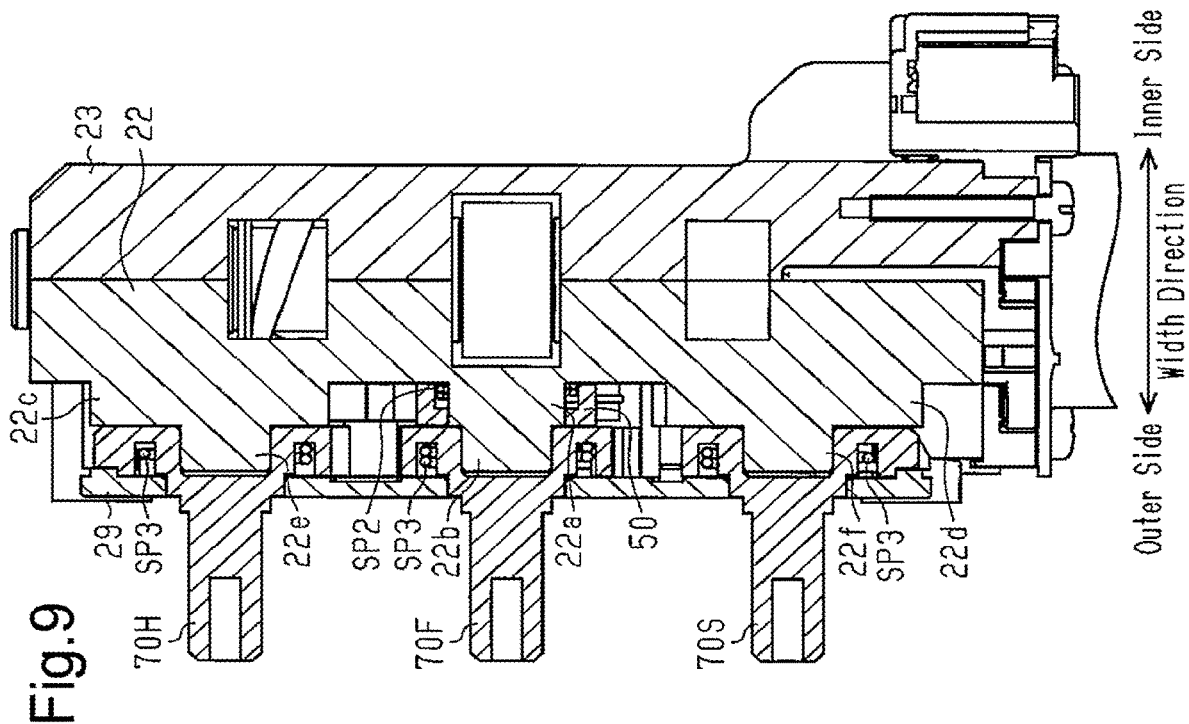
FIG. 9 is a cross-sectional view taken along line 9-9 of FIG. 4B.

As shown in FIGS. 3, 6, and 9, a substantially columnar switch cam support portion 22a is provided to project outward in the seat width direction from a middle portion of the main body case member 22 in the seat height direction. Also, a substantially columnar handle support portion 22b is provided to project further outward in the seat width direction from the switch cam support portion 22a. The handle support portion 22b has a smaller diameter than the switch cam support portion 22a. Substantially trapezoid-shaped base portions 22c, 22d project outward in the seat width direction from parts of the main body case member 22 that are above and below the switch cam support portion 22a. Substantially columnar handle support portions 22e, 22f project outward in the seat width direction from the base portions 22c, 22d, respectively. The outward projecting lengths in the seat width direction of the switch cam support portion 22a and the base portions 22c, 22d are the same, and the outward projecting lengths in the seat width direction of the handle support portions 22b, 22e, 22f are the same. The handle support portions 22b, 22e, 22f have the same outer diameter. Further, the handle support portions 22b, 22e, 22f are arranged side by side at substantially regular intervals in one direction along the seat height direction. That is, the center of the handle support portion 22b is located at the center between the handle support portions 22e, 22f.

Further, the main body case member 22 has substantially circular bearing holes 22g, 22h, which are located between the handle support portions 22b, 22e and symmetric with respect to a straight line that connects the centers of the handle support portions 22b, 22e. The main body case member 22 has a substantially circular bearing hole 22i. The bearing hole 22i and the bearing hole 22g are symmetric with respect to the center of the handle support portion 22b. The bearing holes 22g, 22h, 22i are opened in the seat width direction.

Figure 10:
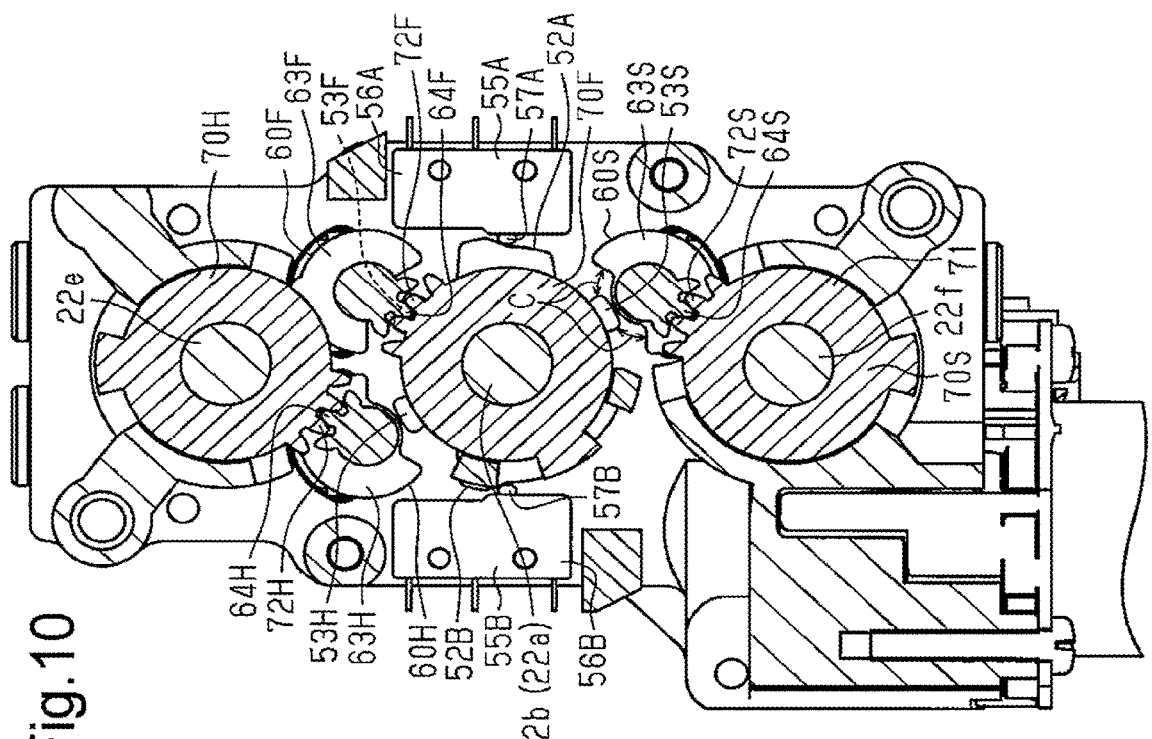
FIG. 10 is a cross-sectional view taken along line 10-10 of FIG. 4C.

The switch cam support portion 22a supports a switch cam 50. The switch cam 50 has a substantially annular main body 51 having an inner diameter equivalent to the outer diameter of the switch cam support portion 22a and a thickness equivalent to the projecting length of the switch cam support portion 22a. The switch cam 50 also has a pair of substantially flange-shaped switch pressing portions 52A, 52B projecting in opposite radial directions from the main body 51. As also shown in FIG. 10, the distal end face of the switch pressing portion 52A is curved to approach the switch cam support portion 22a as the position shifts clockwise about the switch cam support portion 22a. The distal end face of the other switch pressing portion 52B is curved to approach the switch cam support portion 22a as the position shifts counterclockwise about the switch cam support portion 22a. In other words, in FIG. 10, the switch pressing portions 52A, 52B have shapes that are symmetric with respect to the radial straight line (the straight line passing through the centers of the handle support portions 22b, 22e, and 22f) that is orthogonal to the projecting radial direction of the switch pressing portions 52A, 52B.

Further, the switch cam 50 has a pair of substantially fingernail-shaped pressed portions 53H, 53F at positions circumferentially between the switch pressing portions 52A, 52B. The pressed portions 53H, 53F project radially outward from the main body 51 on the side opposed to the handle support portion 22e. Further, the switch cam 50 has a substantially fingernail-shaped pressed portion 53S projecting radially outward from the main body 51 at a circumferential position that is symmetric to the pressed portion 53H with respect to the center of the main body 51. The pressed portions 53H, 53F, 53S have the same shape.

A torsion spring SP2 is arranged between the main body case member 22 and the switch cam 50, and the switch cam 50 is held at a predetermined initial pivoting position by the torsion spring SP2. When in the initial pivoting position, the switch cam 50 disposes the switch pressing portions 52A and 52B on a straight line in a radial direction orthogonal to the straight line passing through the centers of the handle support portions 22b, 22e and 22f.

The cam members 60H, 60F, 60S are respectively supported by the bearing holes 22g, 22h, 22i. That is, as shown in FIGS. 8 and 12, the cam member 60S has a substantially columnar shaft portion 61, which is inserted in and supported by the bearing hole 22i. The cam member 60S also has a switch cam pressing portion 63S, which is substantially major arc-shaped and slides along the outer peripheral portion of the bearing hole 22i on the outer side in the seat width direction of the main body case member 22. The switch cam pressing portion 63S has a substantially columnar cam projection 62, which is loosely inserted in the main body case member 22 in the outer periphery of the bearing hole 22i. The switch cam pressing portion 63S has a thickness equivalent to the thickness of the switch cam 50 and is arranged at a position aligned with the switch cam 50 in the axial direction. The cam member 60S has a sector gear portion 64S, which is adjacent to the switch cam pressing portion 63S and arranged on the outer side of the switch cam pressing portion 63S in the seat width direction in the main body case member 22. The cam member 60S also has a substantially columnar shaft portion 65, which is adjacent to the sector gear portion 64S and arranged on the outer side of the sector gear portion 64S in the seat width direction in the body case member 22.

The cam member 60S is arranged to be in contact with or close to the outer circumferential surface of the cylindrical portion 37 of the cylindrical member 36 and to be in contact with a distal end 43 of the intermediary member 40, which is located on the opposite side of the shaft portion 41. That is, the cam member 60S is arranged such that the cam projection 62 can press the pressing part 38 of the cylindrical member 36 via the intermediary member 40. The neutral position of the cam member 60S is set to the rotational position of the cam member 60S when the straight line in the radial direction passing through the axis of the cam member 60S and the cam projection 62 coincides with the axial direction of the cylindrical member 36, that is, the rotational position of the cam member 60S when the cam projection 62 is the most distant from the helical gear 28. As shown in FIG.

12, when the cam member 60S is in the neutral position, the cam projection 62 presses the pressing part 38 via the intermediary member 40. At this time, the cylindrical member 36 is in a state of being separated from the helical gear 28 against the force of the compression spring SP1, and the fitting hole 39 is disengaged from the fitting portion 32 of the helical gear 28.

Figure 13:
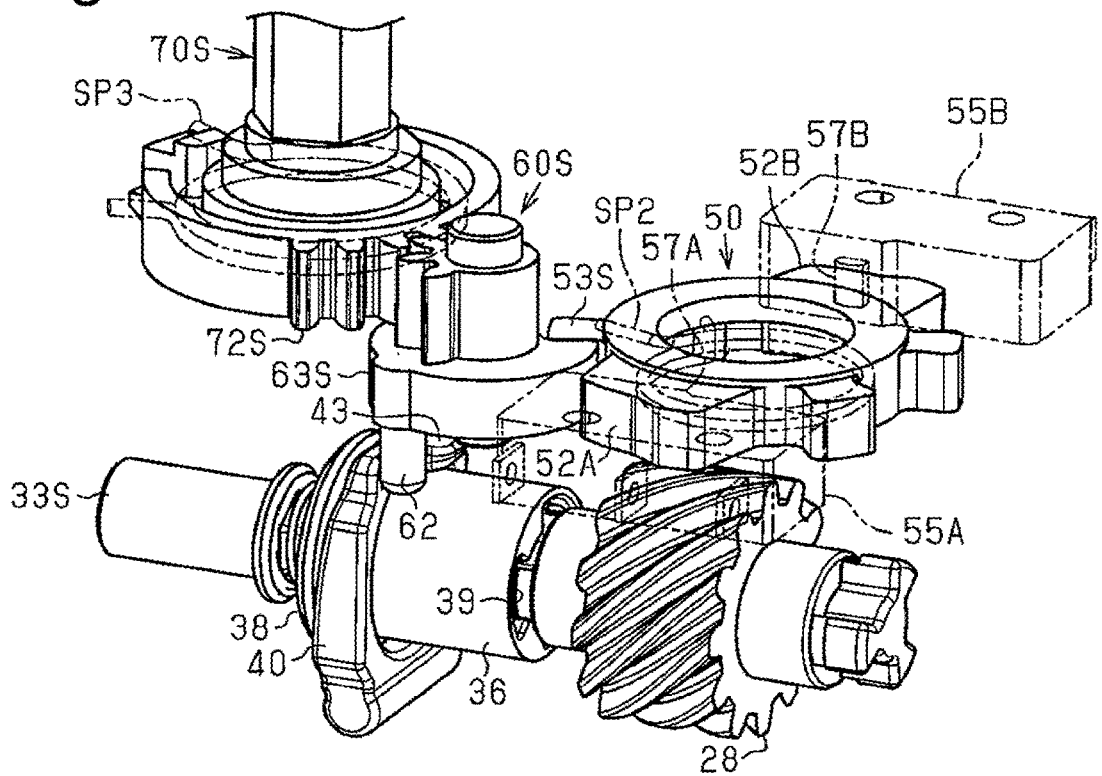
FIG. 13 is a perspective view showing an operation of the seat driving device of FIG. 1 when the operation handle has been pivoted clockwise from the initial position.
Figure 14:
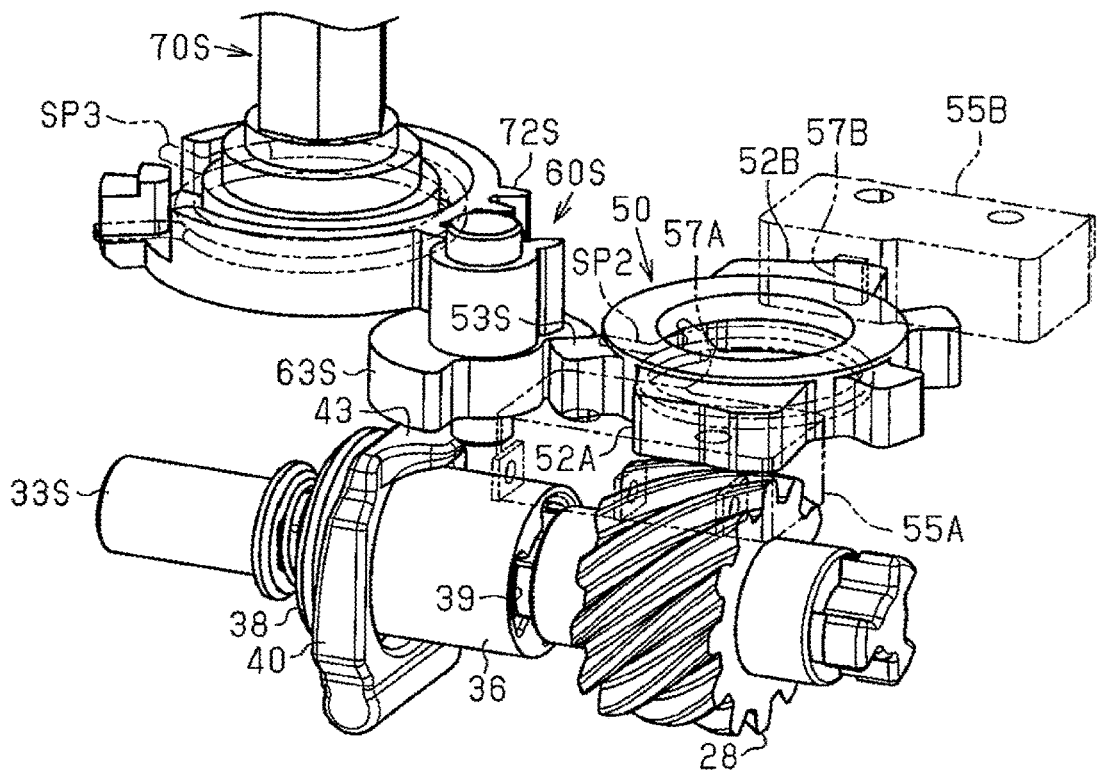
FIG. 14 is a perspective view showing an operation of the seat driving device of FIG. 1 when the operation handle has been pivoted counterclockwise from the initial position.

As shown in FIGS. 13 and 14, when the cam member 60S pivots away from the neutral position, the cam member 60S allows the cylindrical member 36 to be moved such that the fitting hole 39 of the cylindrical member 36, which is urged by the compression spring SP1, is fitted to the fitting portion 32 of the helical gear 28. In contrast, as the cam member 60S pivots to the neutral position, the cam projection 62 presses the pressing part 38 of the cylindrical member 36 via the intermediary member 40. Accordingly, the cam member 60S moves the cylindrical member 36 against the force of the compression spring SP1 to disengage the fitting hole 39 of the cylindrical member 36 from the fitting portion 32 of the helical gear 28.

As shown in FIG. 8, like the cam member 60S, the cam member 60F also has a shaft portion 61, a cam projection 62, a switch cam pressing portion 63F, a sector gear portion 64F, and a shaft portion 65. Also, as shown in FIG. 7, like the cam member 60S, the cam member 60H also has a shaft portion 61, a cam projection 62, a switch cam pressing portion 63H, a sector gear portion 64H, and a shaft portion 65. Accordingly, the cam members 60H and 60F also operate in the same manner as the cam member 60S. As shown in FIG. 10, in each of the cam members 60H, 60F, and 60S in the neutral position, the switch cam pressing portions 63H, 63F, 63S are arranged in a position most distant from the handle support portion 22b (the switch cam support portion 22a) in the radial direction of the handle support portion 22b (the switch cam support portion 22a). However, in the cam member 60S in the neutral position, the sector gear portion 64S faces the handle support portion 22f. In the cam member 60H in the neutral position, the sector gear portion 64H faces the handle support portion 22e. In the cam member 60F in the neutral position, the sector gear portion 64F faces the handle support portion 22b.

In the switch cam 50 in the initial pivoting position, the pressed portions 53H, 53F, 53S face the corresponding cam members 60H, 60F, 60S, respectively. The pressed portions 53H, 53F, 53S are arranged on the pivoting path of the corresponding switch cam pressing portions 63H, 63F, 63S. The pressed portions 53H, 53F, 53S are pressed down by the corresponding switch cam pressing portions 63H, 63F, 63S when the cam members 60H, 60F, 60S in the neutral position pivot in one direction or the other. When any one of the pressed portions 53H, 53F, 53S is pressed by the corresponding one of the switch cam pressing portions 63H, 63F, 63S, the switch cam 50 is pivoted in the direction in which the pressed portion 53H, 53F, 53S are pressed.

Switch structures 55A and 55B are respectively installed on the main body case member 22 so as to be positioned in the outer peripheries of the switch pressing portions 52A and 52B when the switch cam 50 is in the initial pivoting position. The switch structures 55A, 55B face each other with the handle support portion 22b (the switch cam support portion 22a) in between. The switch structures 55A and 55B are arranged symmetrically with respect to a straight line in the radial direction of the handle support portion 22b (the switch cam support portion 22a) orthogonal to the direction in which the switch structures 55A and 55B face each other. The switch structures 55A, 55B respectively have substantially rectangular box-shaped main bodies 56A, 56B and buttons 57A and 57B that can project and retract from the end faces of the main bodies 56A, 56B opposed to the handle support portion 22b (the switch cam support portion 22a). The main bodies 56A, 56B are arranged outside the pivoting path of the switch pressing portions 52A, 52B. In the normal state, the button 57A projects from the main body 56A toward the switch pressing portion 52A, blocks the clockwise pivoting path of the switch pressing portion 52A in FIG. 10, and opens the counterclockwise pivoting path in FIG. 10. In the normal state, the button 57B projects from the main body 56B toward the switch pressing portion 52B, blocks the counterclockwise pivoting path of the switch pressing portion 52B in FIG. 10, and opens the clockwise pivoting path in FIG. 10.

Thus, for example, when the switch cam 50 pivots clockwise in FIG. 10 about the switch cam support portion 22a, the switch pressing portion 52A presses down the button 57A of the switch structure 55A, and the switch pressing portion 52B passes by the button 57B of the switch structure 55B without pressing down the button 57B. In contrast, when the switch cam 50 pivots counterclockwise in FIG. 10 about the switch cam support portion 22a, the switch pressing portion 52A passes by the button 57A of the switch structure 55A without pressing down the button 57A, and the switch pressing portion 52B presses down the button 57B of the switch structure 55B.

Figure 11:
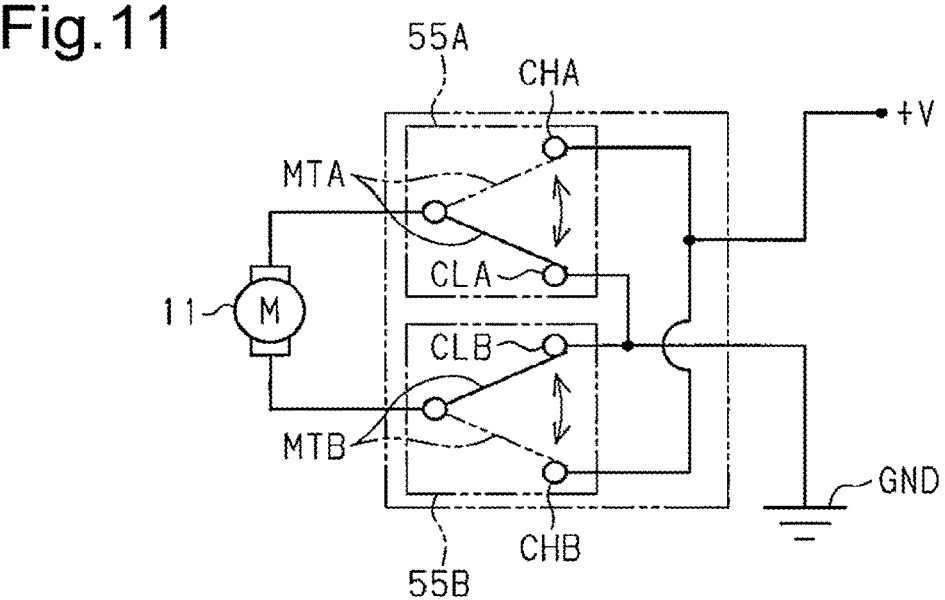
FIG. 11 is an equivalent circuit diagram showing the electrical configuration of the seat driving device of FIG. 1.

As shown in FIG. 11, the switch structures 55A and 55B respectively electric circuit having high potential-side contacts CHA, CHB, low potential-side contacts CLA, CLB, movable terminals MTA, MTB. The high potential-side contacts CHA, CHB are electrically connected to the high potential +V of a DC power source. The low potential-side contacts CLA, CLB are electrically connected to a low potential GND. The movable terminals MTA, MTB are connected to different terminals of the rotary motor 21. The movable terminals MTA and MTB are interlocked with the buttons 57A and 57B, respectively, and are normally electrically connected to the low potential-side contacts CLA and CLB. When the buttons 57A, 57B are pressed down, the movable terminals MTA and MTB are electrically connected to the high potential-side contacts CHA and CHB.

Thus, when the switch cam 50 pivots clockwise from the initial pivoting position in FIG. 10, the movable terminal MTA of the switch structure 55A, in which the button 57A is pressed down by the switch pressing portion 52A, is electrically connected to the high potential-side contact CHA, so that the rotary motor 21 is energized with one polarity. In contrast, when the switch cam 50 pivots counterclockwise from the initial pivoting position, the movable terminal MTB of the switch structure 55B, in which the button 57B is pressed down by the switch pressing portion 52B, is electrically connected to the high potential-side contact CHB, so that the rotary motor 21 is energized with the reverse polarity.

That is, the switch that selectively permits and interrupts the energization of the rotary motor 21 includes the two switch structures 55A and 55B, which energize the rotary motor 21 with the polarity corresponding to the pivoting direction of the switch cam 50. In other words, the switch related to the energization of the rotary motor 21 is constituted by the electric circuits of the switch structures 55A and 55B, which are independent of each other and correspond to different polarities.

As shown in FIG. 10, the handle support portions 22e, 22b, 22f respectively support the handle gear shafts 70H, 70F, 70S. The handle gear shaft 70S has a substantially annular main body 71, which has an inner diameter equivalent to the outer diameter of the handle support portion 22*f* and a thickness equivalent to the projecting length of the handle support portion 22*b* and is pivotally fitted into the handle support portion 22*f*. The handle gear shaft 70S also has a handle gear portion 72S, which is formed in the outer periphery of the main body 71 in a predetermined angular range and meshes with the sector gear portion 64S. As shown in FIG. 3, the handle gear shaft 70S has a substantially polygonal prism-shaped coupling shaft 73S, which is concentric with the main body 71 and projects away from the main body case member 22. Similarly to the handle gear shaft 70S, the handle gear shaft 70F also has a main body 71, a handle gear portion 72F, and a coupling shaft 73F. Further, similarly to the handle gear shaft 70S, the handle gear shaft 70H also has a main body 71, a handle gear portion 72H, and a coupling shaft 73H.

The seat driving device 20 includes a cover 29, which constitutes the housing together with the main body case members 22 and 23. The cover 29 is fastened to the main body case member 22 while covering the main body case member 22 from the outer side in the seat width direction. The cover 29 has three substantially circular bearing holes 29*a*, into which the shaft portions 65 of the cam members 60H, 60F, 60S are rotationally fitted. The cover 29 also has three substantially circular insertion holes 29*b*, into which the coupling shafts 73H, 73F, 73S of the handle gear shafts 70H, 70F, 70S are loosely inserted, respectively. Accordingly, the cam members 60H, 60F, 60S are positioned in the axial direction (the seat width direction) by being sandwiched between the main body case member 22 and the cover 29. In addition, the handle gear shaft 70F is positioned in the axial direction (the seat width direction) by sandwiching the main body 71 together with the switch cam 50 between the main body case member 22 and the cover 29. Each of handle gear shafts 70H, 70S is positioned in the axial direction (the seat width direction) by sandwiching the main body 71 between the main body case member 22 and the cover 29. Further, the switch structures 55A and 55B are positioned in the seat width direction by being sandwiched between the main body case member 22 and the cover 29.

Operation handles 75H, 75F, 75S as operation members are attached to the coupling shafts 73H, 73F, 73S of the handle gear shafts 70H, 70F, 70S, respectively. That is, the operation handles 75H, 75F, 75S have substantially cylindrical coupling portions 76, into which the distal ends of the coupling shafts 73H, 73F, 73S extending through the insertion holes 29*b* are fitted coupling shafts 73H, 73F, 73S cannot pivot. The operation handles 75H, 75F, 75S also have substantially arm-shaped operation portions 77 extending radially from the distal ends of the coupling portions 76. Therefore, the operation handles 75H, 75F, 75S are supported so as to pivot about axes parallel with each other. It goes without saying that the operation handles 75H, 75F, 75S are positioned in the axial direction (the seat width direction) via the corresponding handle gear shafts 70H, 70F, 70S.

A torsion spring SP3 is arranged between each of the handle gear shafts 70H, 70F, 70S and the main body case member 22, so that each of the handle gear shafts 70H, 70F, 70S is held in a predetermined initial position together with the corresponding one of the operation handles 75H, 75F, 75S by the force of the torsion spring SP3. When each of the operation handles 75H, 75F, 75S is in the initial position, the operation portion 77 extends diagonally upward from the coupling portion 76. Further, when the handle gear shafts 70H, 70F, 70S are in their initial positions, the cam members 60H, 60F, 60S, in which the sector gear portions 64H, 64F, 64S mesh with the handle gear portions 72H, 72F, 72S, are arranged at the neutral positions.

The force of the torsion springs SP3, which holds each of the handle gear shafts 70H, 70F, 70S in the initial positions, is set to be greater than the urging force of the compression spring SP1 for moving the cylindrical member 36 so that the fitting hole 39 of each cylindrical member 36 is fitted to the opposed fitting portion 32. Therefore, normally, each of the operation handles 75H, 75F, 75S is held in the initial position, and accordingly, each of the cam members 60H, 60F, 60S is arranged in the neutral position. That is, normally, rotation cannot be transmitted through the cylindrical member 36 between the fitting portion 32 of the helical gear 27 and the headrest height adjustment shaft 33H. Alternatively, rotation cannot be transmitted through the cylindrical member 36 between the fitting portion 32 of the helical gear 28 and the seat back bending shaft 33F or the side support adjustment shaft 33S.

The operation of the present embodiment will now be described.

As shown in FIG. 10, it is assumed that none of the operation handles 75H, 75F, 75S is operated, and all handle gear shafts 70H, 70F, 70S are arranged in the initial positions. At this time, since all the cam members 60H, 60F, 60S are in the neutral positions, the rotation of the helical gears 27, 28 cannot be transmitted to the headrest height adjustment shaft 33H or the like as described above. When the switch cam 50 is in the initial pivoting position, the pressed portions 53H, 53F, 53S are arranged so as to block the pivoting paths of the corresponding switch cam pressing portions 63H, 63F, 63S, respectively. A pair of circumferential clearances C exist between the pressed portions 53H, 53F, 53S and the corresponding switch cam pressing portions 63H, 63F, 63S.

The switch pressing portions 52A and 52B of the switch cam 50 in the initial pivoting position are opposed to the corresponding buttons 57A and 57B. The buttons 57A and 57B are in contact with or close to the corresponding switch pressing portions 52A and 52B, respectively, but are projecting from the main bodies 56A and 56B, respectively. That is, the switch structures 55A and 55B block the connection between the rotary motor 21 and the DC power supply. In FIG. 10, the button 57A blocks the clockwise pivoting path of the switch pressing portion 52A and opens the counterclockwise pivoting path. The other button 57B blocks the counterclockwise pivoting path of the switch pressing portion 52B and opens the clockwise pivoting path.

Then, as shown by the change from the state of FIGS. 10 and 12 to the state of FIG. 13, for example, when the handle gear shaft 70S (the operation handle 75S) is pivoted clockwise from the initial position against the force of the torsion spring SP3, the cam member 60S (the cam projection 62) rotates counterclockwise from the neutral position by the transmission of rotation between the handle gear portion 72S and the sector gear portion 64S. As a result, the cam member 60S is displaced from the neutral position to move the cylindrical member 36 such that the force of the compression spring SP1 causes the fitting hole 39 of the cylindrical member 36 to be fitted to the fitting portion 32 of the helical gear 28. As a result, the rotation of the helical gear 28 can be transmitted to the side support adjustment shaft 33S via the cylindrical member 36.

At the same time, the switch cam pressing portion 63S of the cam member 60S presses, as it pivots from the neutral position, the pressed portion 53S of the switch cam 50 through the free moving region corresponding to the clearance C shown in FIG. 10. As a result, the switch cam 50 pivots clockwise in the drawing about the switch cam support portion 22a from the initial pivoting position against the urging force of the torsion spring SP2.

When the switch cam 50 pivots clockwise as viewed in the drawing, the switch pressing portion 52A presses down the button 57A of the switch structure 55A, which faces the switch pressing portion 52A, and the switch pressing portion 52B passes by the button 57B of the opposed switch structure 55B without pressing down the button 57B. As a result, the rotary motor 21 and the DC power source are connected to each other with the polarity corresponding to the pressed button 57A (the movable terminal MTA), and the rotary motor 21 rotates forward.

In contrast, as shown by the change from the state of FIGS. 10 and 12 to the state of FIG. 14, when the handle gear shaft 70S (the operation handle 75S) is pivoted counterclockwise from the initial position against the force of the torsion spring SP3, the cam member 60S (the cam projection 62) rotates clockwise from the neutral position by transmission of rotation between the handle gear portion 72S and the sector gear portion 64S. As a result, the cam member 60S is displaced from the neutral position to move the cylindrical member 36 such that the force of the compression spring SP1 causes the fitting hole 39 of the cylindrical member 36 to be fitted to the fitting portion 32 of the helical gear 28. As a result, the rotation of the helical gear 28 can be transmitted to the side support adjustment shaft 33S via the cylindrical member 36.

At the same time, the switch cam pressing portion 63S of the cam member 60S presses, as it pivots from the neutral position, the pressed portion 53S of the switch cam 50 through the free moving region corresponding to the clearance C shown in FIG. 10. As a result, the switch cam 50 pivots counterclockwise in the drawing about the switch cam support portion 22a from the initial pivoting position against the urging force of the torsion spring SP2.

When the switch cam 50 pivots counterclockwise as viewed in the drawing, the switch pressing portion 52A passes by the button 57A of the opposed switch structure 55A without pressing down the button 57A, and the switch pressing portion 52B presses down the button 57B of the opposed switch structure 55B. As a result, the rotary motor 21 and the DC power source are connected to each other with the polarity corresponding to the pressed down button 57B (the movable terminal MTB), and the rotary motor 21 rotates backward.

As described above, of the buttons 57A and 57B, the one to be pressed down is determined according to the operation direction of the operation handle 75S, and the rotation direction of the rotary motor 21 is determined. When the rotary motor 21 rotates, its rotation is transmitted to the side support adjustment shaft 33S via the helical gear 25, the helical gears 27 and 28, and the cylindrical member 36. The rotation of the side support adjustment shaft 33S actuates the side support adjustment mechanism M3, such that the side support frames 15 open or close in the seat width direction according to the rotation direction of the side support adjustment shaft 33S.

Thereafter, when the operating force acting on the operation handle 75S is eliminated, the handle gear shaft 70S together with the operation handle 75S is urged by the torsion spring SP3 to return to the initial position. Accordingly, the cam member 60S pivots against the force of the compression spring SP1 due to the transmission of rotation between the handle gear portion 72S and the sector gear portion 64S, and returns to the neutral position. The force of the torsion spring SP3 for returning the handle gear shaft 70S (the operation handle 75S) to the initial position together with the cam member 60S is greater than the force of the compression spring SP1 for moving the cylindrical member 36 as described above. As a result, the rotation of the helical gear 28 cannot be transmitted to the side support adjustment shaft 33S via the cylindrical member 36.

In contrast, when the cam member 60S is returned to the neutral position, the switch cam 50 is released from the depression of the pressed portion 53S by the switch cam pressing portion 63S. The switch cam 50 is then urged by the torsion spring SP2 to return to the initial pivoting position. When the buttons 57A and 57B of the switch structures 55A and 55B are released from the switch pressing portions 52A and 52B, the connection between the rotary motor 21 and the power source is interrupted. This stops the rotation of the rotary motor 21.

The operation described above applies to cases in which the other operation handles 75H, 75F are operated.

As described above, the present embodiment achieves the following advantages.

(1) In the present embodiment, the axis of the helical gear (the driving gear) 25 and the axes of the helical gears (the follower gears) 27, 28 are parallel with each other, and the helical gear 25 and the helical gears 27, 28 constitute a gear train in which they are arranged parallel with each other. The transmission of rotation between the rotary shaft of the rotary motor 21 and each of the clutch mechanisms C1 to C3 (the input shafts) is performed by such a parallel arranged gear train, so that the rotary motor 21 and the clutch mechanisms C1 to C3 can be arranged in a space having a shape conforming to the axes thereof. This allows the overall size of the device to be reduced. It is possible to further reduce the dimension of the seat driving device 20 in the seat width direction and the front-rear direction.

In addition, rotation of the rotary shaft of the rotary motor 21 is transmitted by rolling contact between the helical gear 25 and the helical gears 27 and 28, so that the transmission efficiency is increased. Accordingly, the power (output) required for the rotary motor 21 can be reduced, which allows the size of the rotary motor 21 itself to be reduced.

(2) In the present embodiment, when one of the operation handles 75H, 75F, 75S is operated to one of the two operation directions, the switch cam 50 is moved to be engaged with one of the switch structures 55A, 55B (switch), so that one of the switch structures 55A, 55B is actuated to energize the rotary motor 21 with the polarity corresponding to the operation direction. Therefore, it is possible to actuate the switch structures 55A, 55B in a manner interlocking with the operation of any one of the operation handles 75H, 75F, 75S with a very simple structure.

(3) In the present embodiment, the switch cam 50 is a single member shared by the operation handles 75H, 75F, 75S. Since the single switch cam 50 is sufficient for the operation handles 75H, 75F, and 75S, the number of components is reduced. In addition, the structure of the seat driving device 20 is further simplified, which reduces the costs.

(4) In the present embodiment, the three operation handles 75H, 75F, 75S are supported so as to pivot about axes parallel with each other. The common switch cam 50 is arranged coaxially with the operation handle 75F, which has an axis positioned in the middle of the three operation handles 75H, 75F, and 75S. Accordingly, the switch cam 50 can be easily coupled to the operation handle 75F and the remaining two operation handles 75H, 75S.

(5) In the present embodiment, transmission of rotation between the rotary shaft of the rotary motor 21 and each of the clutch mechanisms C1 to C3 (the input shafts) is carried out by the low-tooth-count helical gear 25 and the helical gears 27 and 28 with high efficiency and high deceleration ratio.

(6) In the present embodiment, the rotation axes of the three operation handles 75H, 75F, and 75S are arranged separately. Thus, unlike a case in which the operation handles 75H, 75F, 75S are coaxially arranged, no overlapping occurs. This reduces the dimension in the axial direction (the seat width direction).

(7) In the present embodiment, the switch structures 55A, 55B are directly operated by the switch cam 50 (the switch pressing portions 52A, 52B). Thus, for example, the number of components can be reduced as compared with a case where an appropriate switch lever for operating the switch structures 55A and 55B is interposed.

(8) In the present embodiment, the switch related to energization of the rotary motor 21 is constituted by the electric circuits of the two separate switch structures 55A, 55B. That is, the switch is constituted by a simple circuit configuration, which improves the versatility.

(9) In the present embodiment, since the plurality of position adjustment mechanisms (M1 to M3) can be selectively operated by the single rotary motor 21, it is possible to simplify the electrical configuration required for operation. In addition, each of the clutch mechanisms C1 to C3 has a structure (so-called shaft coupling) that connects, to the helical gears 27 and 28, the output shaft (the headrest height adjustment shaft 33H, the seat back bending shaft 33F, the side support adjustment shaft 33S) corresponding to the position adjustment mechanism (M1 to M3). Thus, each of the clutch mechanisms C1 to C3 can be intensively arranged about the output shaft or the like, and the entire device can be further downsized. Furthermore, since the number of functions (the number of position adjustment mechanisms) related to the seat position adjustment can be increased by the number of output shafts (three), the restriction on the number of functions is relaxed.

(10) In the present embodiment, by pivoting one of the operation handles 75H, 75F, 75S from the initial position, the corresponding one of the clutch mechanisms C1 to C3 is engaged. Also, the switch structures 55A, 55B energize the rotary motor 21 with the polarity corresponding to the operation direction of the operation handle. Accordingly, the rotary motor 21 can be rotated forward or backward in accordance with the operation direction of the operation handles 75H, 75F, 75S. Also, the operation direction of each of the operation handles 75H, 75F, 75S and the adjustment direction of the position adjustment mechanisms (M1 to M3) can be set to facilitate understanding of the relationship of these directions.

(11) In the present embodiment, the number of output shafts can be easily increased by increasing the number of helical gears (27, 28) directly or indirectly meshing with the helical gear 25.

The above-described embodiment may be modified as follows.

In the above-illustrated embodiment, the operation portions 77 of the operation handles 75H, 75F, 75S may have, for example, a dial shape.

In the above-illustrated embodiment, the number of teeth of the helical gear 25 may be three or greater.

In the above-illustrated embodiment, the numbers of teeth of the two helical gears 27 and 28 may be different from each other. That is, acceleration or deceleration may be performed at the transmission of rotation between the two helical gears 27 and 28.

In the above-illustrated embodiment, all the operation handles 75H, 75F, 75S may be arranged coaxially. That is, one handle support portion may be provided on the main body case member 22, and that one handle support portion may be shared by all the operation handles 75H, 75F, 75S. However, in order to facilitate the operation of the switch structures 55A, 55B by the operation handles 75H, 75F, 75S, the switch cams are preferably arranged to be pivotal about axes different from the axes of the operation handles 75H, 75F, 75S. In this case, switch cams may be provided to correspond to each of the operation handles 75H, 75F, 75S. Alternatively, a single switch cam may be shared by the operation handles 75H, 75F, 75S.

In the above-illustrated embodiment, the switch cam 50 may be omitted, and each of the operation handles 75H, 75F, 75S may be provided with a pressed portion (53H, 53F, 53S) and a switch pressing portions (52A, 52B). That is, each of the operation handles 75H, 75F, 75S may have the function of switch cams.

In the above-illustrated embodiment, a switch structure constituted by integrating the switch structures 55A, 55B may be employed.

In the above-illustrated embodiment, two output shafts may be selectively connected to the helical gear 27. That is, the helical gear 27 may have two output paths (that is, two position adjustment mechanisms).

Alternatively, one output shaft may be selectively connected to the helical gear 28. That is, the helical gear 28 may have one output path (that is, one position adjustment mechanism).

The number of the helical gears directly or indirectly meshing with the helical gear 25 may be changed. The number may be, for example, one or more than two. In the case of more than two helical gears, one output shaft may be selectively connected to each of the helical gears.

In any case, it is necessary to provide the same number of operation handles and the like as the number of the output shafts of the entire seat driving device.

In the above-illustrated embodiment, a spur gear (small gear) may be employed in place of the helical gear (25) provided on the rotary shaft, and spur gears (large gears) may be employed instead of the helical gears (27, 28) provided on the clutch mechanisms (the input shafts).

In the above-illustrated embodiment, the position adjustment mechanisms may include various position adjustment mechanisms provided on the seat, for example, a reclining mechanism for tilting the seat back with respect to the seat cushion, a slide mechanism for sliding the seat cushion back and forth or up and down, a mechanism for adjusting the length of the seat cushion, and a leg rest mechanism. Further, the position adjustment mechanisms may include a tilt adjustment mechanism and a lock mechanism for the steering apparatus.

The invention claimed is:

1. A seat driving device comprising:
 a rotary motor having a rotary shaft;
 a plurality of operation members separately arranged to respectively correspond to a plurality of position adjustment mechanisms, wherein the rotary motor is configured such that, when any one of the operation members is operated, the rotary motor is energized with a polarity that corresponds to an operation direction of the operation member;

a plurality of clutch mechanisms separately arranged to respectively correspond to the position adjustment mechanisms, wherein each clutch mechanism is configured such that, when any one of the operation members is operated, the clutch mechanism selectively connects the corresponding position adjustment mechanism to the rotary motor;

a driving gear provided on the rotary shaft;

a follower gear, which meshes with the driving gear and constitutes an input shaft of each clutch mechanism;

a switch, which is configured to selectively permit and interrupt energization of the rotary motor; and a switch cam, which is coupled to the operation members, wherein, when any one of the operation members is operated, the switch cam is engaged with the switch to actuate the switch such that the rotary motor is energized with a polarity that corresponds to the operation direction of the operation member, wherein each of the clutch mechanisms is arranged with respect to the rotary motor such that an axis of the clutch mechanism is parallel with an axis of the rotary shaft of the rotary motor, and wherein the switch cam is a single member shared by the operation members.

2. The seat driving device according to claim 1, wherein the switch includes a first switch structure and a second switch structure, which are independent from each other and configured to energize the rotary motor with the polarity that corresponds to the operation direction of the operation member.

3. The seat driving device according to claim 1, wherein the operation members are three operation members that are supported to pivot about parallel axes.

4. The seat driving device according to claim 3, wherein the axes of the operation members are different from each other.

5. The seat driving device according to claim 1, wherein
the driving gear is a helical gear having a tooth count of four or less, and
the follower gear is a helical gear.

6. The seat driving device according to claim 1, wherein the follower gear has an axis that is parallel with the axis of the driving gear.

7. The seat driving device according to claim 1, wherein
each of the clutches includes an output shaft that is arranged to be coaxial with the input shaft and is selectively connected to the input shaft, and
the input shaft and the output shaft each have an axis that is parallel with the axis of the driving gear.

* * * * *